United States Patent [19]

Nagumo

[11] Patent Number: 4,908,720
[45] Date of Patent: Mar. 13, 1990

[54] SOLID-STATE COLOR IMAGE PICKUP CAMERA WHICH HAS REGISTRATION ADJUSTING CIRCUITS SO AS TO ADJUST THE RED AND BLUE IMAGES SO THAT THEY REGISTER WITH THE GREEN IMAGE

[76] Inventor: Fumio Nagumo, c/o Sony Corporation, 7-35, Kitashinagawa 6-chome, Shinagawa-ku, Japan

[21] Appl. No.: 347,719

[22] Filed: May 4, 1989

Related U.S. Application Data

[63] Continuation-in-part of Ser. No. 155,585, Jan. 12, 1988, abandoned.

[30] Foreign Application Priority Data

Feb. 20, 1987 [JP] Japan .................. 62-37242

[51] Int. Cl.$^4$ ................. H04N 9/093; H04N 9/09
[52] U.S. Cl. ........................ 358/51; 358/50
[58] Field of Search ..................... 358/41, 50, 51

[56] References Cited

U.S. PATENT DOCUMENTS 4,521,804 6/1985 Bendell ................. 358/51
4,593,311 6/1986 Levine ................... 358/51

FOREIGN PATENT DOCUMENTS

| 57-67391 | 4/1982 | Japan | 358/51 |
| 58-59690 | 4/1983 | Japan | 358/51 |
| 58-85678 | 5/1983 | Japan | 358/51 |
| 58-186283 | 10/1983 | Japan | 358/51 |
| 60-146589 | 8/1985 | Japan | 358/51 |
| 2135851 | 9/1984 | United Kingdom . | |
| 2151107 | 7/1985 | United Kingdom . | |

*Primary Examiner*—James J. Groody
*Assistant Examiner*—Randall S. Svihla
*Attorney, Agent, or Firm*—Hill, Van Santen, Steadman & Simpson

[57] ABSTRACT

A solid-state image pickup apparatus which produces output color image signals having the required number of scanning lines from the respective color signals which are obtained by photographing an image formed by an image pickup tube. In the apparatus, the image pickup section consists of solid-state image sensors which produce one color signal with the required number of scanning lines and other color signals with the number of scanning lines which are more than the required number. A registration adjustment means executes registration adjustment processing on the color signals obtained at the image pickup device by using the other color signals.

4 Claims, 5 Drawing Sheets

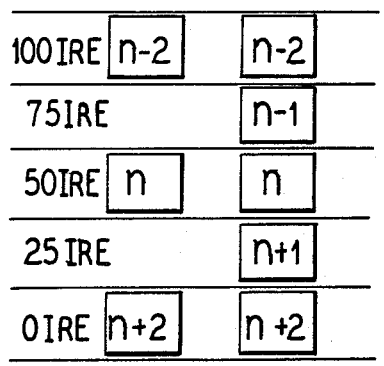
FIG. 8
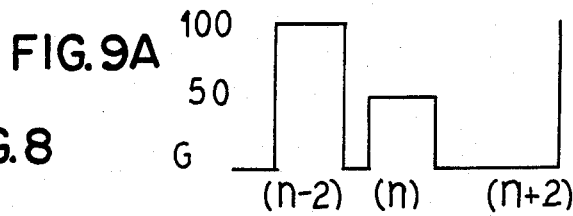
FIG. 9A
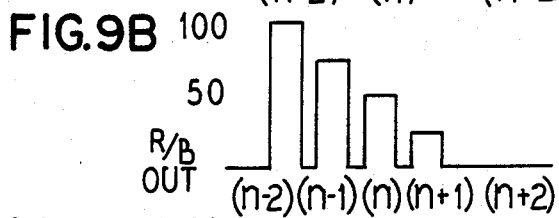
FIG. 9B
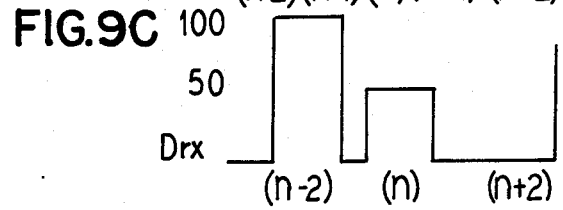
FIG. 9C
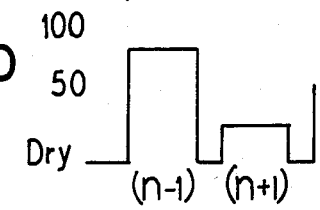
FIG. 9D
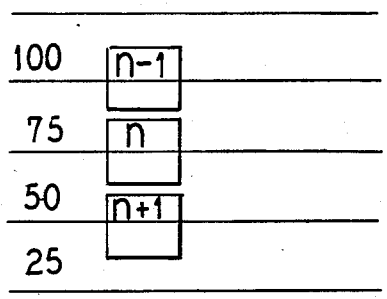
FIG. 10A
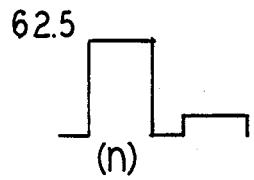
FIG. 10B
FIG. 11
| LINE | R | B |
|---|---|---|
| 1 | | |
| 2 | | |
| 3 | | |
| n-1 | 001 | 001 |
| n | 010 | 010 |
| n+1 | 100 | 100 |
001 : $-\tau/4 \leq \varepsilon \leq +\tau/4$
010 : $-3\tau/4 \leq \varepsilon < -\tau/4$
011 : $+\tau/4 < \varepsilon \leq 3\tau/4$
100 : $-\tau < \varepsilon < -3\tau/4$
101 : $3\tau/4 < \varepsilon < \tau$

SOLID-STATE COLOR IMAGE PICKUP CAMERA WHICH HAS REGISTRATION ADJUSTING CIRCUITS SO AS TO ADJUST THE RED AND BLUE IMAGES SO THAT THEY REGISTER WITH THE GREEN IMAGE

CROSS-REFERENCES TO RELATED APPLICATIONS

This application is a continuation-in-part of prior application Ser. No. 155,585 which was filed on Feb. 12, 1988, now abandoned.

BACKGROUND OF THE INVENTION

1. Field of the Invention

This invention relates to a solid-state color image pickup apparatus which uses a solid-state image sensor such as a charge coupled device (CCD) as an imager for producing an image of an object, and more particularly, to an apparatus which adjusts registration errors or superposition errors of an image for each color produced in the optical image pickup system by using electrical signal processing.

2. Description of the Prior Art

In a color image pickup equipment, color images can be reproduced by producing an image of an object after decomposing it into optical images comprising three-primary-color images of red, green and blue and by superposing these images which have the respective colors. In this connection, since superposition errors, such as registration errors of the images of each color appear on a reproduced color image as a color discrepancy, such errors must be maintained at a minimum level.

Generally in color image pickup equipment, registration errors of the images of each color occur due to a color magnification aberration of the optical image pickup system. These registration errors should be adjusted. Particularly, in case there are no errors in the center part of a picture, the registration errors caused by color magnification aberration tend to increase as the distance from the center part of the picture increases. Therefore, it is not possible to eliminate said registration errors of the optical image pick up system simply by making the registration errors of the center part of the picture zero by using mechanical registration adjustments.

A known color television camera with an image pickup tube is used to execute registration adjustment for eliminating said registration errors by adjusting the mechanical positions of an image pickup plane of the images for each color and by electrically adjusting the deflection system. Also in a solid-state color television camera using a solid-state image sensor comprising, for example, a CCD, the image pickup region could not be adjusted by the deflection system which is unlike the image pickup tube type camera, so mechanical registration adjustment with high precision has been attempted.

In case real time registration adjustment is executed by electrically processing signals in solid-state color image pickup devices, complicated superposition is required since there are few data especially in the vertical direction. Also, the above-mentioned interpolation procedure lowers the resolution, which gives rise to another problem.

SUMMARY OF THE INVENTION

So as to avoid the foregoing problem in the invention, there is provided a solid-state color image pickup apparatus for outputting color image signals having prescribed number of scanning lines generated from the respective color signals which are formed at an image pickup section from images produced by the decomposed image pickup beams for each color, and wherein registration adjustment is performed by electrical signal processing for converting the number of scanning lines of said color signals into a prescribed number so as to obtain output color signals which have more scanning lines than the prescribed number obtained from a solid-state image sensor in the image pickup section.

Stated differently, it is an object of the present invention to provide a solid-state pickup apparatus of novel structure which can provide color image pickup outputs of advanced image quality with high resolution in the vertical direction.

Other features and advantages of the present invention will be apparent in the following description, the appending claims and the accompanying drawings.

BRIEF DESCRIPTION OF THE DRAWINGS

FIG. 8 is a chart which illustrates picture elements;

FIGS. 9A, 9B and 9C are graphs for explaining the invention;

FIGS. 10A and 10B are views used to explain the invention; and

FIG. 11 is a chart showing registration errors.

DESCRIPTION OF THE PREFERRED EMBODIMENTS

The invention will now be described by way of example with reference to the accompanying drawings.

Figure 1:
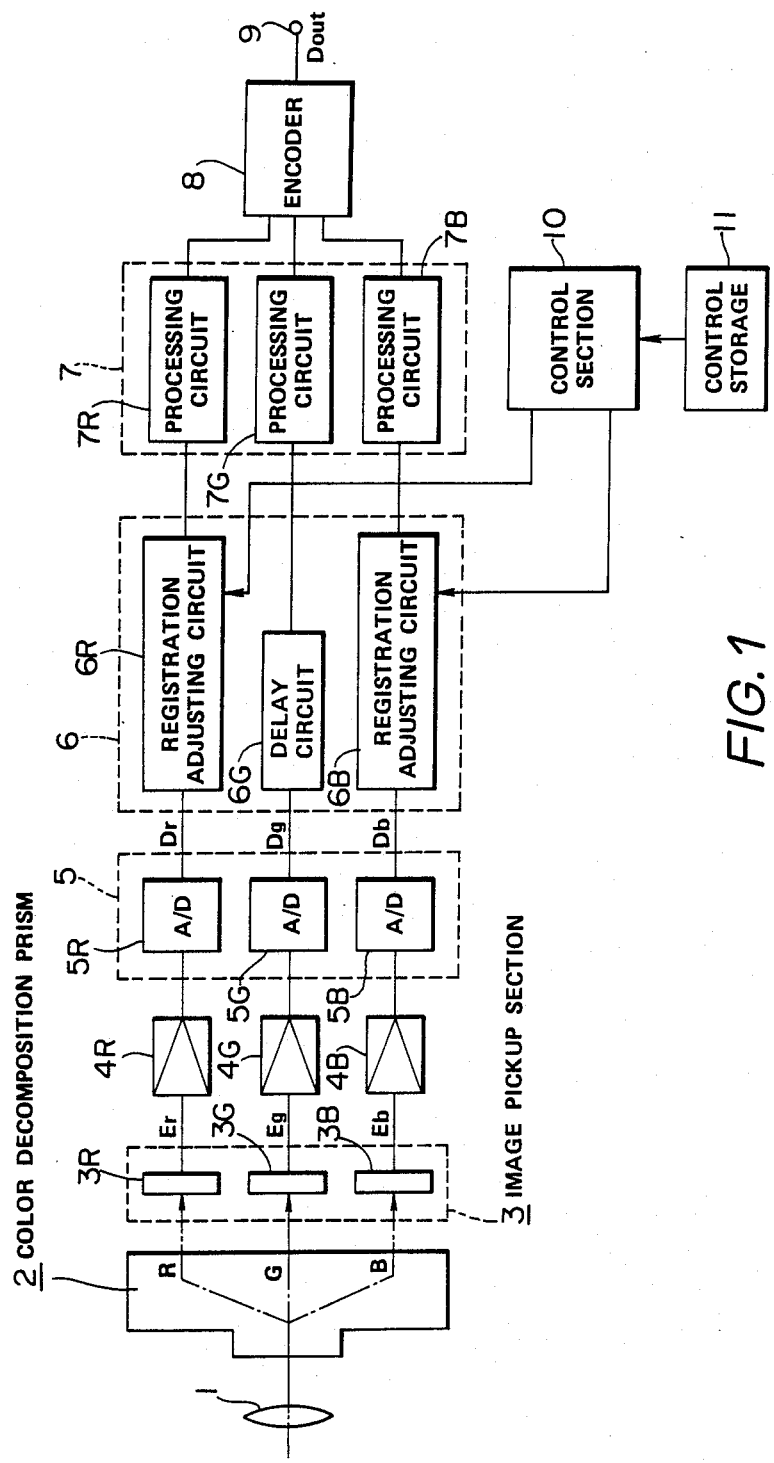
FIG. 1 is a block diagram showing a construction of an embodiment of a solid-state color image pickup apparatus according to the invention.

In the embodiment shown in FIG. 1, the present invention is applied to a so-called three-plate type CCD digital television camera which produces output color image signals having 525/2 scanning lines/field, of the NTSC system. An image pickup beam from an object is guided from an image pickup lens 1 through a color decomposing prism 2 and is irradiated on each of three CCD image sensors 3R, 3G, 3B which constitute an image pickup section 3 for imaging operation.

The image pickup beam guided to the image pickup section 3 from the image pickup lens 1 through the color decomposing prism 2 is thereby separated into three-primary color beam elements, that is, a red beam R, a green beam G, and a blue beam B. Each optical image of these three-primary beams R, G, B is formed on the respective image pickup planes of the respective CCD image sensors 3R, 3G, 3B of the image pickup section 3.

Pictures of each optical image from the three primary color beams R, G, B are obtained at the respective CCD image sensors 3R, 3G, 3B of the image pickup section 3, which output three-primary color signals, namely, a red signal Er, a green signal Eg, and a blue signal Eb as the image pickup outputs. The CCD image sensor 3G for producing the green optical image outputs the green signal Eg having 525/2 lines whereas the other CCD image sensors 3R and 3B output the red signal Er and blue signal Eb, respectively, each of which have 525 lines which is twice as many as the CCD image sensor 3G.

The three-primary color signals Er, Eg, Eb thus obtained at the image pickup section 3 are supplied to an analog to digital (A/D) converting section 5 through amplifiers 4R, 4G, 4R, respectively. In the A/D converting section, three-primary color signals Er, Eg, Eb are digitized in three A/D converters 5R, 5G, 5B so as to form data which corresponds to each color Dr, Dg, Db. The data Dr, Dg, Db are supplied to a processing section 7 through a registration adjustment processing section 6. After gamma adjustment and/or clamp procedure are performed, for example, in the respective processing circuits 7R, 7G, 7B of the processing section 7, the data Dr, Dg, Db appear at an output terminal 9 after passing through an encoder 8 which converts them into color image data, Dout of the NTSC system, for example.

Figure 2:
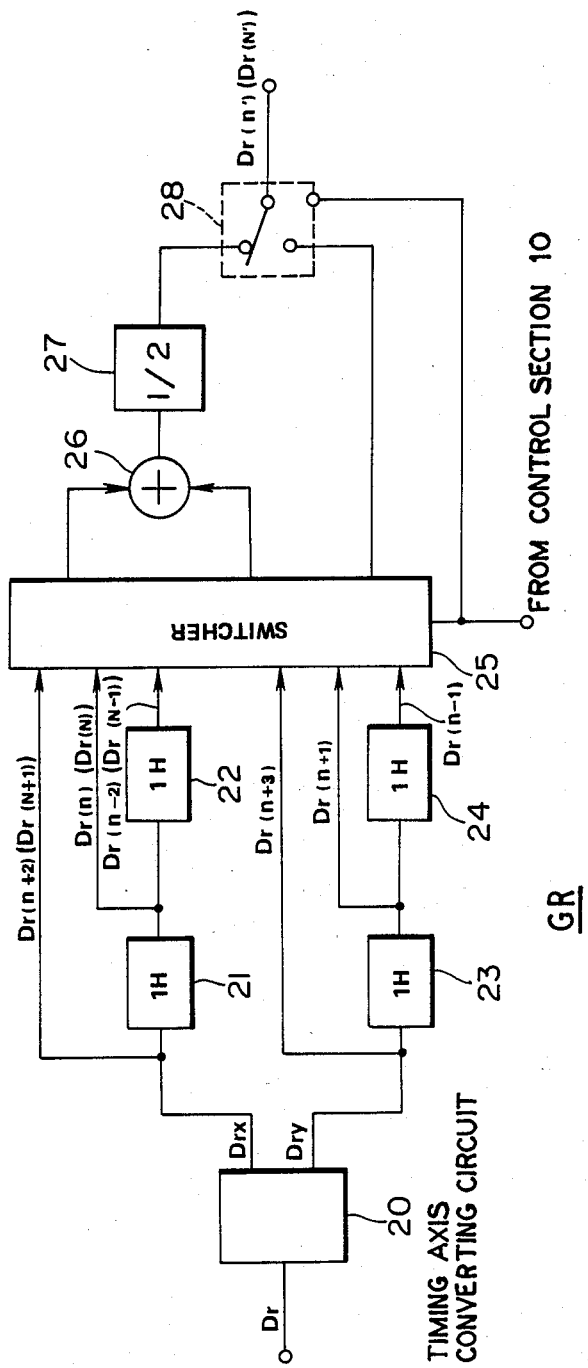
FIG. 2 is a block diagram showing a construction of a registration adjusting circuit in the embodiment of FIG. 1.

In the registration adjustment processing section 6 of the present embodiment, registration adjustment of the red signal Er and blue signal Eb obtained at CCD image sensors 3R, 3B, respectively, is performed on the basis of the green signal Eg which is obtained at the other CCD image sensor 3G which produces green optical images in the image pickup section 3. The registration adjustment processing section 6 comprises two registration adjusting circuits 6R, 6B each of which executes adjustments of the red data Dr and the blue data Db by changing the number of scanning lines. As seen in FIG. 2, the registration adjusting circuit 6R for executing the adjustment processing of the red data Dr consists of a timing axis converting circuit 20 which alternately distributes the red data DR having 525 scanning lines and converts it to a timing axis having 525/2 scanning lines. As shown in FIG. 2, the red data is alternately supplied as outputs Drx and Dry shown at the output of connecting circuit 20. These signals have a timing axis of 525/2. Four 1H delay circuits 21, 22, 23, 24 each of which have a delay corresponding to one horizontal scanning period (1H of the NTSC system) receive the outputs Drx and Dry of converter 20. A switcher 25 is controlled by control data from a control section 10 which will be described later receives data from converter 20 and delay circuits 21, 22, 23 and 24. An adder 26 for adding data selected by the switcher 25 supplies an output to a coefficient circuit 27 which multiplies the added outputs of the adder 26 by a coefficient of ½. A switch 28 selects data at the output of the coefficient circuit 27 or from the switcher 25. In circuit 6R, there are obtained red data Dr(n−2), Dr(n−1), Dr(n), Dr(n+1), Dr(n+2), adjacent each other in the vertical direction of one frame picture element, by providing two-channel red data Drx, Dry which obtains the red data Dr from the timing axis converting circuit 20 with 1H delay from said four 1H delay circuits 21, 22, 23, 24. Regarding data Dr(n−2), Dr(n−1), Dr(n), Dr(n+2), Dr(n+2), n represents an identified line. n+1 represents a line one after the identified line. n−1 represents a line one before the identified line. n+2 is a line two after the identified line, and n−2 is a line two before the identified line. By changing the number of scanning lines from 525 to 525/2, the registration adjusting circuit 6 performs an adjusting operation so as to retain registration errors of less than $\tau/4$ in contrast to a picture element pitch in the vertical direction with respect to the CCD image sensor 3R for photographing red optical images and this procedure will be described.

Figure 3:
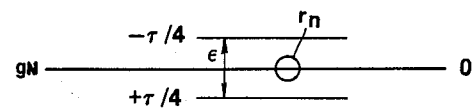
FIGS. 3 to 7 are schematic views for explaining the operation of the registration adjusting procedure which are applied to still images obtained in the embodiment of FIG. 1.
Figure 4:
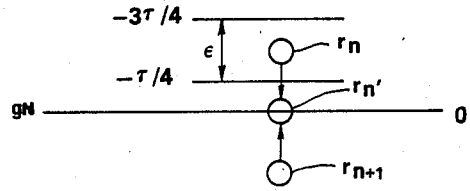
Figure 5:
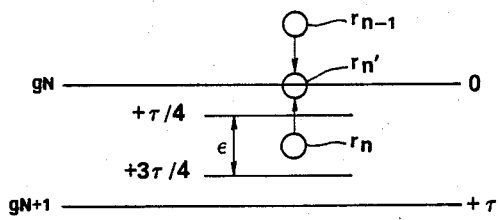
Figure 6:
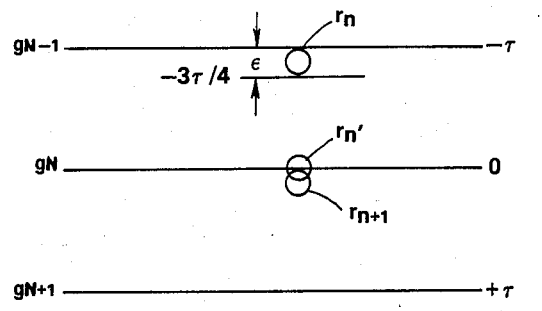
Figure 7:
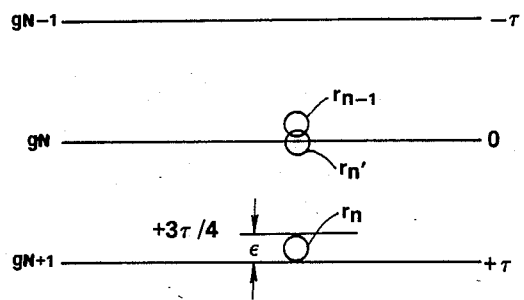

When the registration error $\epsilon$ in the vertical direction from a picture element r(n) of the CCD image sensor 3R for photographing red optical images corresponding to a picture element g(n) in one frame picture element of the CCD image sensor 3G for photographing green optical images is present in the range of $-\tau/4 < \epsilon < +\tau/4$ as shown in FIG. 3, the red data Dr(n) corresponding to said picture element r(n) is selected by the switcher 25 and the switch 28 to be outputted as the red data Dr(n') for which the registration adjustment has already been executed. When the registration error $\epsilon$ is present in the range of $-3\tau/4 < \epsilon < -\tau/4$ as shown in FIG. 4, the red data Dr(n) corresponding to the picture element r(n) and the red data Dr(n+1) corresponding to the picture element r(n+1) which is one line after are selected by the switch 25 to obtain red data Dr(n') for which registration adjustment of $$Dr(n')=(Dr(n)+Dr(n+1))/2$$

has been already executed are obtained at the output through switch 28. Further, when the registration error $\epsilon$ is present in the range of $+\tau/4 < \epsilon < +3\tau/4$ as shown in FIG. 5, red data Dr(n) corresponding to the picture element r(n) and red data Dr(n−1) corresponding to the picture element r(n−1) which is one line before are selected by the switcher 25 so as to produce output red data Dr(n') to which registration adjustment of $$Dr(n')=(Dr(n)+Dr(n-1))/2$$

has been already executed through the switch 28. Also, when the registration error $\epsilon$ is present in the range of $-\tau < \epsilon < -3\tau/4$ as shown in FIG. 6, red data Dr(n+1) which corresponds to the picture element r(n+1) which is one line after are selected by the switcher 25 and the switch 28 so as to output red data Dr(n') to which registration adjustment has been already executed. Also, when the registration error $\epsilon$ is present in the range of $+3\tau/4 < \epsilon < +\tau$ as shown in FIG. 7, red data Dr(n−1) which corresponds to the picture element r(n−1) which is one line after are selected by the switch 25 and the switch 28 so as to output as red data Dr(n') to which the registration adjustment has been already executed.

The registration adjusting circuit 6B for executing adjustment to the blue data D6, has a circuit construction which is similar to the registration adjusting circuit 6R for the red data Dr.

The control section 10 which controls the operation of the above-explained registration adjustment processing section 6 calculates the control data which are required to adjust the registration error of the red and blue data Dr, Db based on the green data Dg in the respective registration adjusting circuits 6R, 6B by interpolation on the basis of each color data Dr, Dg, Db which have been previously obtained by photographing a test chart. The control data are stored in a control storage 11. The registration adjustment processing section 6 performs registration adjustment during the actual photographing operation by changing the number of the scanning lines of the red data Dr and blue data Db from 525 lines to 525/2 lines under control of the control section 10 on the basis of the control data stored in the control storage 11. Thus, the data previously stored in the control storage 11 selects which outputs into the switcher 25 will be supplied to the output of switch 25.

As is evident from the description given above of the embodiment, the registration adjustment is executed by changing the number of scanning lines, and it becomes possible to execute registration adjustment with high precision with the registration adjusting circuit 6R, 6B having a simple construction while producing little or no deterioration of the vertical resolution.

Stated differently, in a solid-state color image pickup apparatus of the present invention, the registration adjustment is executed by changing the number of scanning lines of the color signals which are outputted from the solid-state image sensor of the image pickup section to the desired number, so that deterioration of the vertical resolution is to be prevented. Also, it becomes possible to facilitate superposition of data during the registration adjustment during electrical signal processing, and thus color image pickup outputs of high picture quality can be obtained.

First, in the preparing step, a test chart shown in FIG. 8 is picked up by a camera. According to the present invention, the test chart has horizontal stripes, each having a width corresponding to the vertical size of a picture element of R/B CCD imager and having the light level varying stepwisely as shown in FIG. 8. In FIG. 8, IRE shows the luminance level of the video signal which is obtained from the CCD imager picking up the chart, and 100 IRE is white and 0 IRE is black. When such a test chart is picked up by G CCD which generates 262.5 lines every field, the output signal thereof is as shown in FIG. 9A, and when this chart is picked up by R/B CCD which generates 525 lines every field, the output thereof is as shown in FIG. 9B. This signal is supplied to time axis converter 20 and separated into Drx and Dry which are shown in FIG. 9C and FIG. 9D of the attached sheet.

FIG. 8 shows the case where no registration error exists, but actually, in the area corresponding to the upper or lower end of the raster, there is a certain degree of registration error. This is simply shown in FIG. 10A. In FIG. 10A, picture element n of R/B CCD is located at the boundary of the stripes of 75 IRE and 50 IRE. If there is no registration error, this picture element should be located at the stripe of 50 IRE. Therefore, the registration error is one-half pitch of the strip ($\tau/2$). In this case, the signal level of Drx during n (N) period becomes $(75+50)/2=62.5$ IRE as shown in FIG. 10B, while the signal level of G during n (N) period is 50 IRE. So, the above registration error ($\tau/2$) can be calculated by detecting the difference between 50 IRE and 62.5 IRE. Then the calculated error is stored in address N of the control storage 11. The data to be stored in this storage 11 is encoded according to the range shown in FIG. 3 to FIG. 7. The rough construction of the storage 11 is shown in FIG. 11, and an example of the coding rule is also shown in FIG. 11.

Next, in the actual imaging operation, the data in the control storage 11 is read out in synchronism with the read out sequence of each CCD and each data is converted to control signals for controlling the switchers 25 and 28 in control circuit 10. These switchers are controlled in every horizontal period in accordance with the data stored in the corresponding address of the control storage 11. The concrete switching method is described above relative to FIGS. 3 to 7.

The explanation of how the terms such as, $Dr(n+3)$, $Dr(n+2)$ and $Dr(n-2)$ shown in FIG. 2 are used for interpolation is as follows. Basically, only the data $Dr(n)$, $Dr(n-1)$ and $Dr(n+1)$ are enough for interpolating the correct data $Dr(n')$ according to the interpolating method explained with FIG. 3 through FIG. 7. However, in order to increase the accuracy of interpolation, other terms $Dr(n+3)$ ... may be used in addition to the terms $Dr(n)$, $Dr(n-1)$ and $Dr(n+1)$. For example, in the case of FIG. 4, it is explained how the corrected data $Dr(n')$ is obtained by averaging the data $Dr(n)$ and $Dr(n+1)$. But, in an alternate manner, the correct data $Dr(n')$ can be interpolated by averaging $Dr(n-1)$, $Dr(n)$, $Dr(n+1)$, and $Dr(n+2)$, that is $Dr(n')=(Dr(n-1)+Dr(n)+Dr(n+1)+Dr(n+2))/4$. According to this alternate way, even if noise is introduced in these terms, this noise is higher averaged than that executed in the method explained previously, so the averaged value can be closer to the real value than that obtained by the previous method. Therefore, higher accuracy interpolation can be performed. This is quite similar to using a higher ordered digital filter which has finer filter characteristics.

It is to be understood that other embodiments and modifications are possible without departing from the spirit or essential character of the invention.

I claim as my invention:

1. A solid-state color image pickup apparatus which has a plurality of solid-state image pickup elements, the apparatus comprising:
   a color decomposing prism which receives an incident light image and decomposes it into red, blue, and green light images;
   a plurality of solid-state image pickup elements which are responsive to the red, blue, and green light images and which produce analog signals representing the three primary colors red, blue, and green, wherein at least the red and blue analog signals have more horizontal scanning lines than are normally used in one conventional television field;
   a plurality of analog-to-digital (A/D) converters which receive and digitize the red, blue, and green analog signals;
   a pair of registration adjustment means which receive and interpolate the red and blue digital signals;
   a control means which controls said pair of registration adjustment means on the basis of control data; and
   a control data storage which supplies the control data to said control means.

2. A solid-state color image pickup apparatus according to claim 1 wherein the green analog signal has the same number of horizontal scanning lines as are normally used in one conventional television field and the red and blue analog signals have twice as many horizontal scanning lines as are normally used in one conventional television field.

3. A solid-state color image pickup apparatus according to claim 2 wherein each of said pair of registration adjustment means comprises:
   a timing axis converting circuit which produces first and second outputs;
   first and second delay circuits which respectively receive the first and second outputs of said timing axis converting circuit;

third and fourth delay circuits which respectively receive outputs of said first and second delay circuits;

a switcher which receives the first and second outputs of said timing axis converting circuit, the outputs of said first and second delay circuits, outputs of said third and fourth delay circuits, and an output of said control means; and an adder which receives first and second outputs of said switcher.

4. A solid-state color image pickup apparatus according to claim 3 wherein said control data storage has stored therein control data.

* * * * *